(12) United States Patent
Wieczorek et al.

(10) Patent No.: US 9,702,188 B2
(45) Date of Patent: Jul. 11, 2017

(54) FIXED MOTOR SPRING SHADE

(75) Inventors: Joseph P. Wieczorek, Lake Orion, MI (US); Bryan Busha, Grand Blanc, MI (US); Leslie R. Hinds, Oxford, MI (US); Gary James Clark, Troy, MI (US)

(73) Assignee: Irvin Automotive Products, LLC, Pontiac, MI (US)

( * ) Notice: Subject to any disclaimer, the term of this patent is extended or adjusted under 35 U.S.C. 154(b) by 2242 days.

(21) Appl. No.: 11/450,698

(22) Filed: Jun. 9, 2006

(65) Prior Publication Data
US 2007/0051478 A1 Mar. 8, 2007

Related U.S. Application Data

(63) Continuation-in-part of application No. 11/220,923, filed on Sep. 7, 2005.

(51) Int. Cl.
*B60J 1/20* (2006.01)
*E06B 9/60* (2006.01)
*E06B 9/42* (2006.01)
*E06B 9/50* (2006.01)

(52) U.S. Cl.
CPC ............... *E06B 9/60* (2013.01); *B60J 1/2033* (2013.01); *B60J 1/2063* (2013.01); *E06B 9/42* (2013.01); *E06B 9/50* (2013.01)

(58) Field of Classification Search
USPC ......... 296/97.8, 37.16; 705/110; 160/370.22, 160/323.1, 232.1, 903, 313, 23.1, 24, 314
See application file for complete search history.

(56) References Cited

U.S. PATENT DOCUMENTS

| 1,766,746 | A | * | 6/1930 | Heckman | E06B 9/60 |
| | | | | | 160/23.1 |
| 4,168,094 | A | * | 9/1979 | Yagi | 296/37.16 |
| 4,202,578 | A | | 5/1980 | Roullier | |
| 4,222,601 | A | * | 9/1980 | White et al. | 296/37.16 |
| 4,671,557 | A | | 6/1987 | Lemp | |
| 4,757,852 | A | * | 7/1988 | Jentof | E06B 9/54 |
| | | | | | 160/23.1 |
| 4,781,234 | A | * | 11/1988 | Okumura et al. | 160/23.1 |
| 4,932,704 | A | | 6/1990 | Ament | |
| 5,031,682 | A | * | 7/1991 | Tedeschi | 160/315 |
| 5,036,898 | A | * | 8/1991 | Chen | B60J 1/2033 |
| | | | | | 160/23.1 |
| 5,054,533 | A | * | 10/1991 | Lii | B60J 1/2063 |
| | | | | | 160/23.1 |
| 5,271,446 | A | * | 12/1993 | Hwang | 160/23.1 |
| 5,464,052 | A | * | 11/1995 | Wieczorek | B60R 5/047 |
| | | | | | 160/23.1 |

(Continued)

*Primary Examiner* — Katherine Mitchell
*Assistant Examiner* — Candace L Bradford
(74) *Attorney, Agent, or Firm* — Raggio & Dinnin, P.C.

(57) ABSTRACT

A security shade for use in an automotive vehicle. The security shade includes a cassette having a roll tube arranged therein. The roll tube has a shade panel fixed to the roll tube at one end thereof. The security shade also includes a bearing arranged in an end of the roll tube and a spring housing arranged in an end of the cassette. A motor spring is arranged within the spring housing and is axially fixed with relation to the roll tube and the cassette. The security shade also includes an end cap arranged over an end of a cassette. The security shade has the compressible end cap over each end of the roll tube and cassette.

20 Claims, 6 Drawing Sheets

(56) References Cited

U.S. PATENT DOCUMENTS

| | | | | |
|---|---|---|---|---|
| 5,495,884 A * | 3/1996 | Shikler | ............... | B60J 1/2047 |
| | | | | 160/120 |
| 5,813,449 A * | 9/1998 | Patmore | ............... | B60R 5/047 |
| | | | | 160/24 |
| 5,934,354 A * | 8/1999 | Price | ............... | B60R 5/047 |
| | | | | 160/313 |
| 6,039,105 A * | 3/2000 | Patmore et al. | ............... | 160/24 |
| 6,213,186 B1 * | 4/2001 | Torres | ............... | B60J 1/2038 |
| | | | | 160/24 |
| 6,460,593 B1 * | 10/2002 | Floyd | ............... | B60J 1/205 |
| | | | | 160/250 |
| 6,483,027 B1 * | 11/2002 | Howard et al. | ............... | 174/496 |
| 6,709,039 B1 * | 3/2004 | Davenport | ............... | B60R 5/047 |
| | | | | 160/323.1 |
| 6,715,525 B2 * | 4/2004 | Ehrenberger | ............... | B60R 21/06 |
| | | | | 160/23.1 |
| 6,904,608 B2 * | 6/2005 | Jeong | ............... | G11B 33/12 |
| | | | | 369/263.1 |
| 7,048,319 B2 * | 5/2006 | Ament et al. | ............... | 296/37.16 |
| 7,267,311 B2 * | 9/2007 | Jung | ............... | 248/266 |
| 7,337,823 B2 * | 3/2008 | Wieczorek et al. | ............... | 160/24 |
| 7,591,296 B2 * | 9/2009 | Busha et al. | ............... | 160/24 |
| 2002/0144791 A1 * | 10/2002 | Shell et al. | ............... | 160/24 |
| 2005/0224196 A1 * | 10/2005 | Rasmussen | ............... | E06B 9/50 |
| | | | | 160/323.1 |
| 2007/0158037 A1 * | 7/2007 | Bohlen | ............... | E06B 9/50 |
| | | | | 160/323.1 |
| 2009/0102226 A1 * | 4/2009 | Busha | ............... | B60J 1/2063 |
| | | | | 296/97.8 |
| 2009/0127369 A1 * | 5/2009 | Mullet | ............... | E06B 9/56 |
| | | | | 242/379 |

* cited by examiner

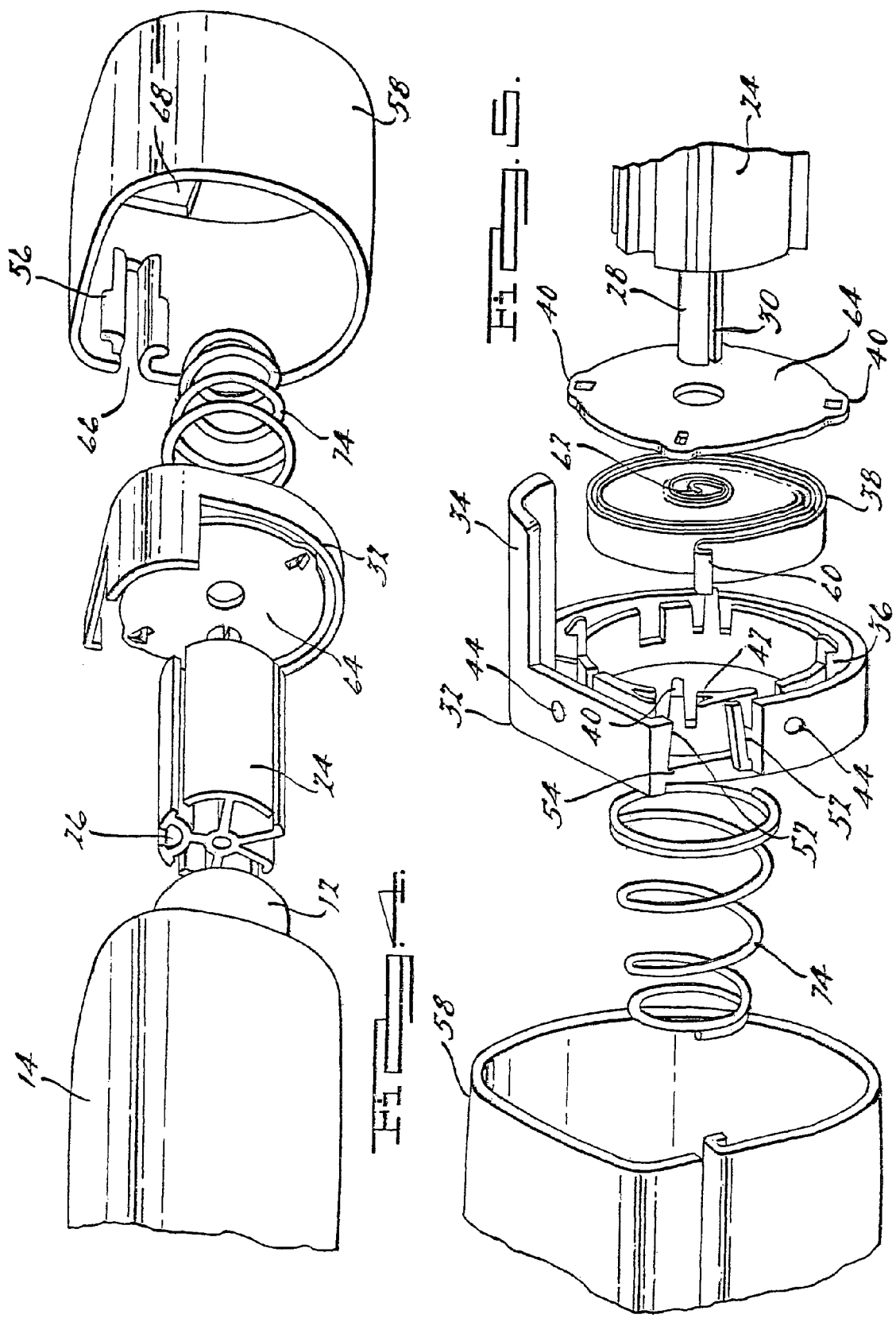

FIXED MOTOR SPRING SHADE

This is a continuation in part of patent application Ser. No. 11/220,923 filed Sep. 7, 2005

BACKGROUND OF THE INVENTION

1. Field of the Invention

The present invention generally relates to security shades and more particularly relates to security shades for use in an automotive vehicle.

2. Description of Related Art

Security shades have been known for many years in the art. There are many styles of motor vehicles that do not provide covered areas for storing cargo or other personal items. In these vehicles any articles in the cargo area can be easily viewed from the exterior of the vehicle. To hide these articles from view, motor vehicle manufactures provide a flexible security shade or panel that can be extended to cover the cargo area and prevent anyone outside the vehicle from readily viewing any stored articles.

Many prior art security shades generally include a flexible fabric panel, which is wrapped on to a roller tube and mounted to a support structure in the vehicle. The roller tube is rotationally biased so that the panel can be extended to cover the compartment area and retracted onto the roller tube for storage when not in use. The end of the shade panel is normally provided with a pull tube or stiffner having a handle that enables the panel to be conveniently extended. The pull tube also includes clips or tabs which engage brackets mounted to the vehicle side walls in the cargo area and maintain the panel in its extended position. Many of these prior art security shades are mounted in vehicles such that the roller tube is positioned across from one end of the cargo area with the shade panel being extendible rearward toward a vehicles rear cargo door. The security shade is positioned behind a rear seat back which can be folded down to enlarge cargo area of the vehicle. When the cargo area is enlarged the security shade may be removed to prevent it from restricting and reducing the cargo area. For this and many other reasons, security shades often feature a mounting system which allows them to be removed from and reinstalled into the vehicle. Therefore, the end units and roller tubes for security shades include many components which increase the cost and complexity along with the weight of the overall security shade unit. Many of the prior art security shades require many components to properly create a removable mounting portion of the security shade and rotational biasing component for the roller tube. Generally, this type of assembly requires many hours of individual labor and requires many different components that are adaptable to different vehicle applications, including vehicle models, vehicle widths, or orientation of the security shade within the automotive interior. Many of these prior art security shades have a fixed end that is not compressible and one compressible end to allow for insertion into the vehicle interior and proper securing of the security shade within the cargo area.

Therefore, there is a need in the art for an improved security shade for use in an automotive vehicle. There also is a need in the art for a security shade that reduces the weight by reducing the number of components while still providing appropriate robustness and durability when the security shade panel is being extended or retracted onto the roller tube for storage. Furthermore, there is a need in the art for a security shade that uses a fixed motor spring. There also is the need in the art for a security shade that has a compression support assembly on both ends of the security shade that will allow a greater range of compression for multiple vehicle positions. Also there is a need in the art for a security shade having end cap travel distance and spring force that can be adjusted to meet requirements of various manufacturers of multiple vehicle lines and sizes.

SUMMARY OF THE INVENTION

One object of the present invention may be to provide an improved security shade.

Another object of the present invention may be to provide a security shade having a spring housing that contains or has a motor spring arranged therein.

Still a further object of the present invention may be to provide a fixed motor spring that will reduce potential for noise during operation of the security shade.

Yet a further object of the present invention may be to provide a fixed motor spring that will allow for a greater range of compression of the end unit to allow for multiple vehicle sizes and positions within the interior of the vehicle.

Still a further object of the present invention may be to provide a security shade that has end cap travel distance and spring forces that are adjustable to meet various vehicle configurations and manufacturer requirements.

Yet a further object of the present invention may be to provide a security shade that has compressible end units wherein the compression is independent of the motor spring position.

Still a further object of the present invention may be to provide a security shade that will prevent the end cap from being removed or dislodged from a spring housing.

To achieve the foregoing objects, a security shade for use in a vehicle according to the present invention is disclosed. The security shade includes a roller tube and a shade panel fixed to the roll tube at one end thereof. The security shade also includes a cassette with the roller tube arranged therein. A bearing is arranged in an end of the roller tube while a spring housing is arranged in an end of the cassette. The motor spring is arranged within the spring housing and axially fixed with relation to the roll tube and the cassette. The security shade also includes an end cap arranged over an end of the cassette.

One advantage of the present invention is that it may provide an improved security shade.

Another advantage of the present invention is that it may provide a security shade having a spring housing that contains a motor spring therein.

Still a further advantage of the present invention is that it may provide a security shade that has a fixed motor spring which may potentially reduce noise during operation of the security shade.

Still a further advantage of the present invention may be that the fixed motor spring allows a greater range of compression for various vehicle positions and various vehicle models and sizes.

Still another advantage of the present invention may be that the security shade end cap travels a predetermined distance and has a predetermined spring force that can be adjustable to meet various manufacturer requirements and various vehicle sizes.

Yet another advantage of the present invention may be that the security shade has a compressible end unit on both ends thereof.

Yet another advantage of the present invention may be that the end units of the security shade have compression that is independent of the motor spring.

Still another advantage of the present invention may be that the end caps are not removable from a spring housing of the security shade.

Other objects, features, and advantages of the present invention will become apparent from the subsequent description and appended claims taken in conjunction with the accompanying drawings.

BRIEF DESCRIPTION OF THE DRAWINGS

FIG. 3 shows an exploded view of the security shade according to the present invention.

FIG. 4 shows a partial exploded view of a security shade according to the present invention.

FIG. 5 shows a partial exploded view of a security shade according to the present invention.

DESCRIPTION OF THE EMBODIMENT(S)

Figure 1:
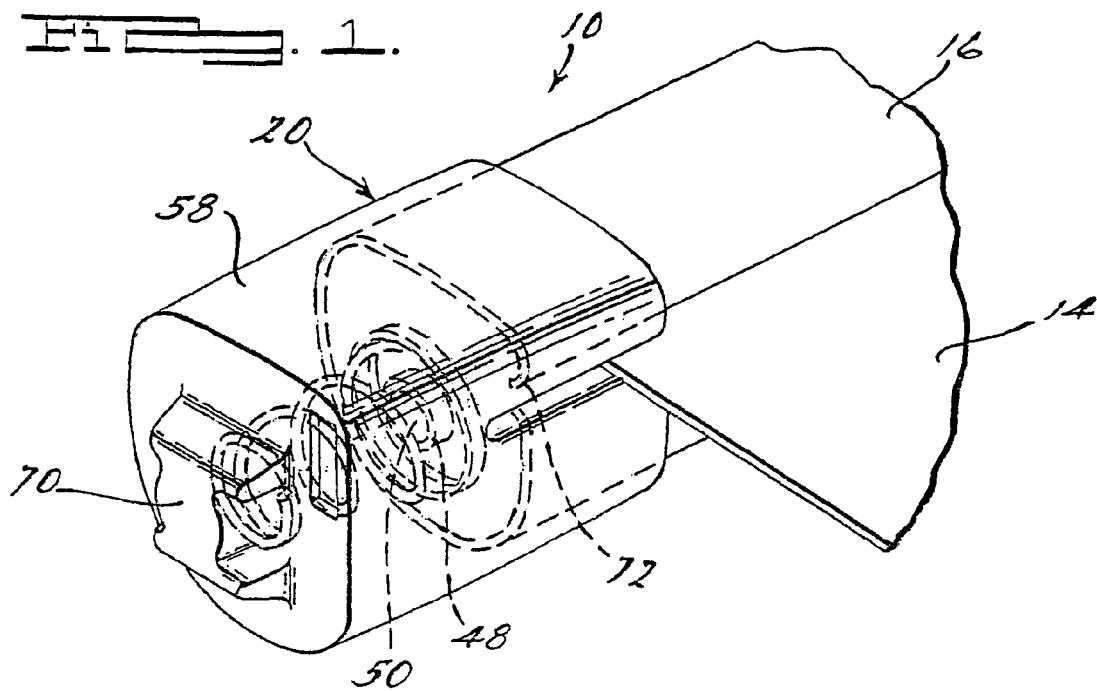
FIG. 1 shows an end of a security shade in its fully extended position according to the present invention.

According to the drawings, a security shade 10 for use in an automotive vehicle according to the present invention is shown. It should be noted that the security shade 10 is generally used in a motor vehicle but may be used in any type of vehicle that includes a cargo area, wherein the security shade 10 will be used to cover the cargo area and hide contents located within the cargo area from a person outside the vehicle. The security shade 10 is generally arranged near a rear seat of an automotive vehicle and pulled towards the rear hatch, door or trunk of the motor vehicle into its extended position. The security shade 10 however, may be arranged at other locations within the vehicle cargo area or interior of the vehicle. The security shade 10 may extend from one side wall to another side wall or from the rear portion of the cargo area toward the rear seat of the automotive vehicle. The security shade 10 will be removable and capable of being stored either inside or outside the vehicle when not in use.

The security shade 10 includes a roll tube 12 with a shade panel 14 wound about the roll tube 12 and fixed to the roll tube 12 on one end of the panel 14. The opposite end of the shade panel 14 includes a pull tube or pull handle. The pull handle will be pulled to deploy the shade panel 14 and unroll the shade panel 14 from the roll tube 12. At its fully extended position clips or fasteners on or near the end of the pull handle or panel 14 are engaged with corresponding brackets in the cargo area side walls of the vehicle to retain the shade panel 14 in its extended position covering the cargo area. When the clips are disengaged, the rotational biasing force exerted by the roll tube 12 and associated end or support assemblies will wind the shade panel 14 back onto the roll tube 12 for storage.

The roll tube 12 has a predetermined length that will vary based on the automotive vehicle in which the roll tube 12 is being used. The roll tube 12 is generally hollow and has a diameter and configuration which is predetermined depending on the design requirements of the security shade 10. The roll tube 12 will have a rib 22 extending from an interior surface thereof along the entire length thereof. The roll tube 12 is arranged within a cassette or trim cover 16 which fits over both the roll tube 12 and the wound shade panel 14. The cassette 16 protects the mechanical components of the security shade 10 from inadvertent damage, and prevents foreign objects from interfering with the operation and provides an enhanced appearance for the security shade 10. The cassette 16 includes a longitudinal slot 18 along an entire length thereof which will provide a route for the shade panel 14 to be deployed from and retracted onto the roll tube 12 without interference. The roll tube 12 and cassette 16 are generally made of a hard plastic material, however any other composite, fabric, ceramic, natural material, metal, or any other known material may be used for the roll tube 12 or cassette 16 according to the present invention. A support subassembly 20 is arranged on each end of the roll tube 12 and cassette 16.

Figure 2:
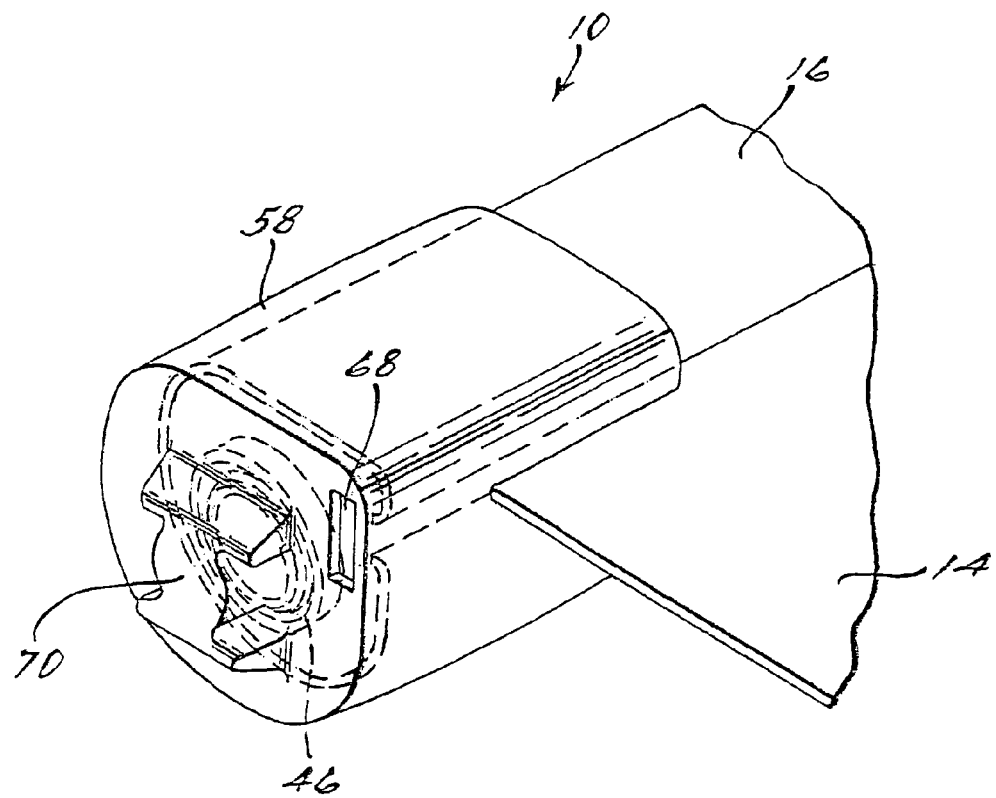
FIG. 2 shows an end of a security shade in its fully compressed position according to the present invention.
Figure 2:
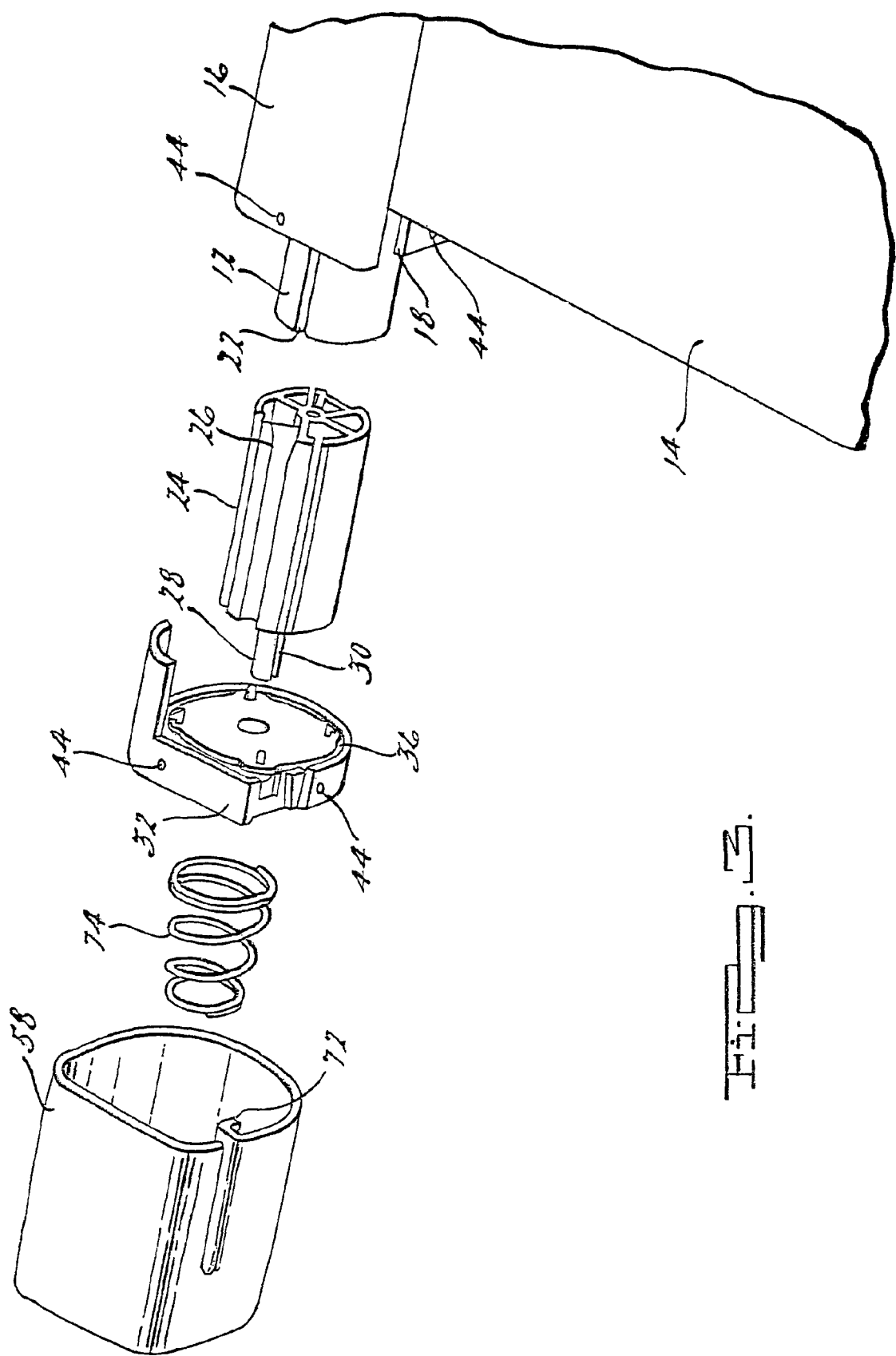
Figure 6:
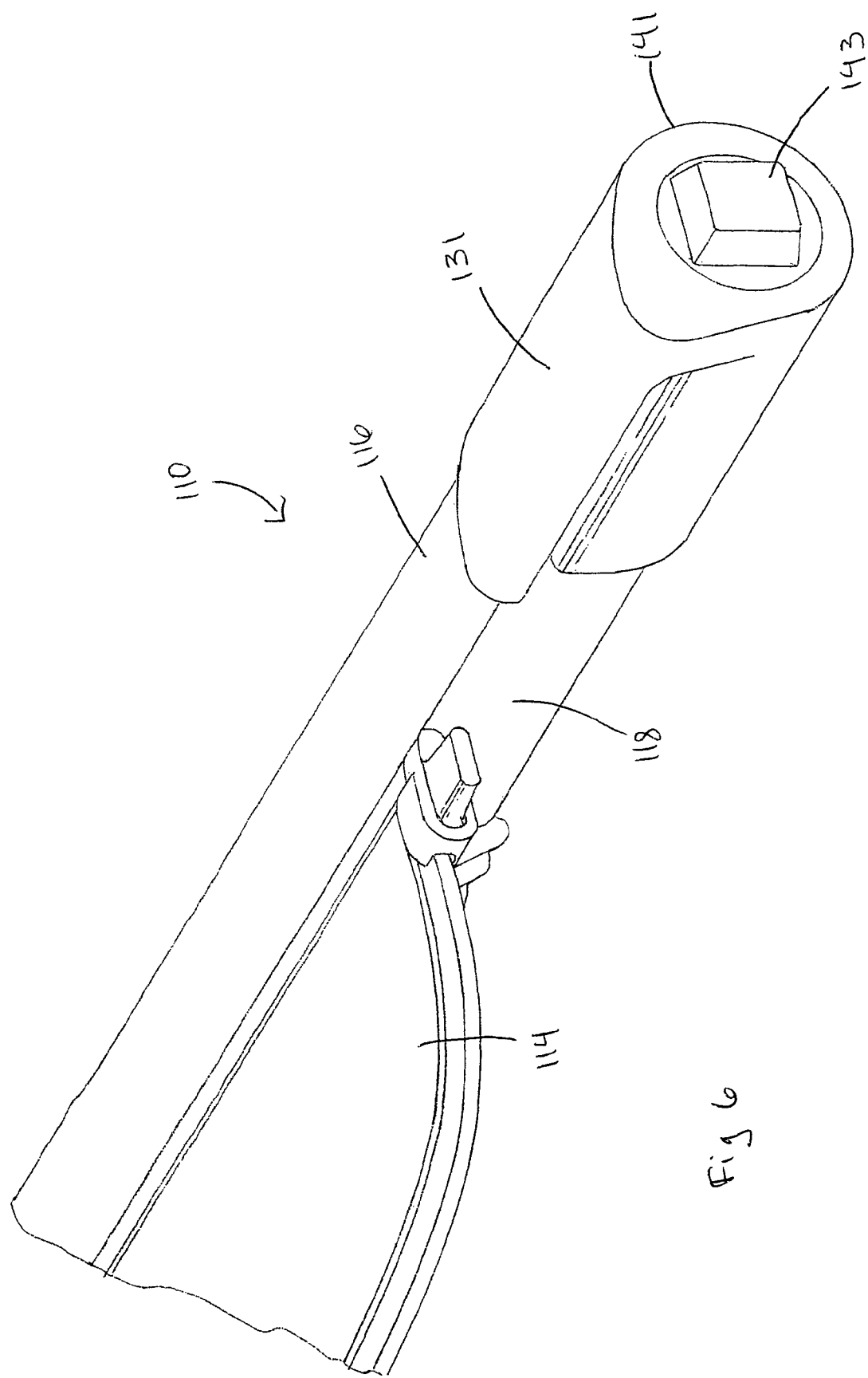
FIG. 6 shows an end of a security shade according to an alternate embodiment of the present invention.
Figure 7:
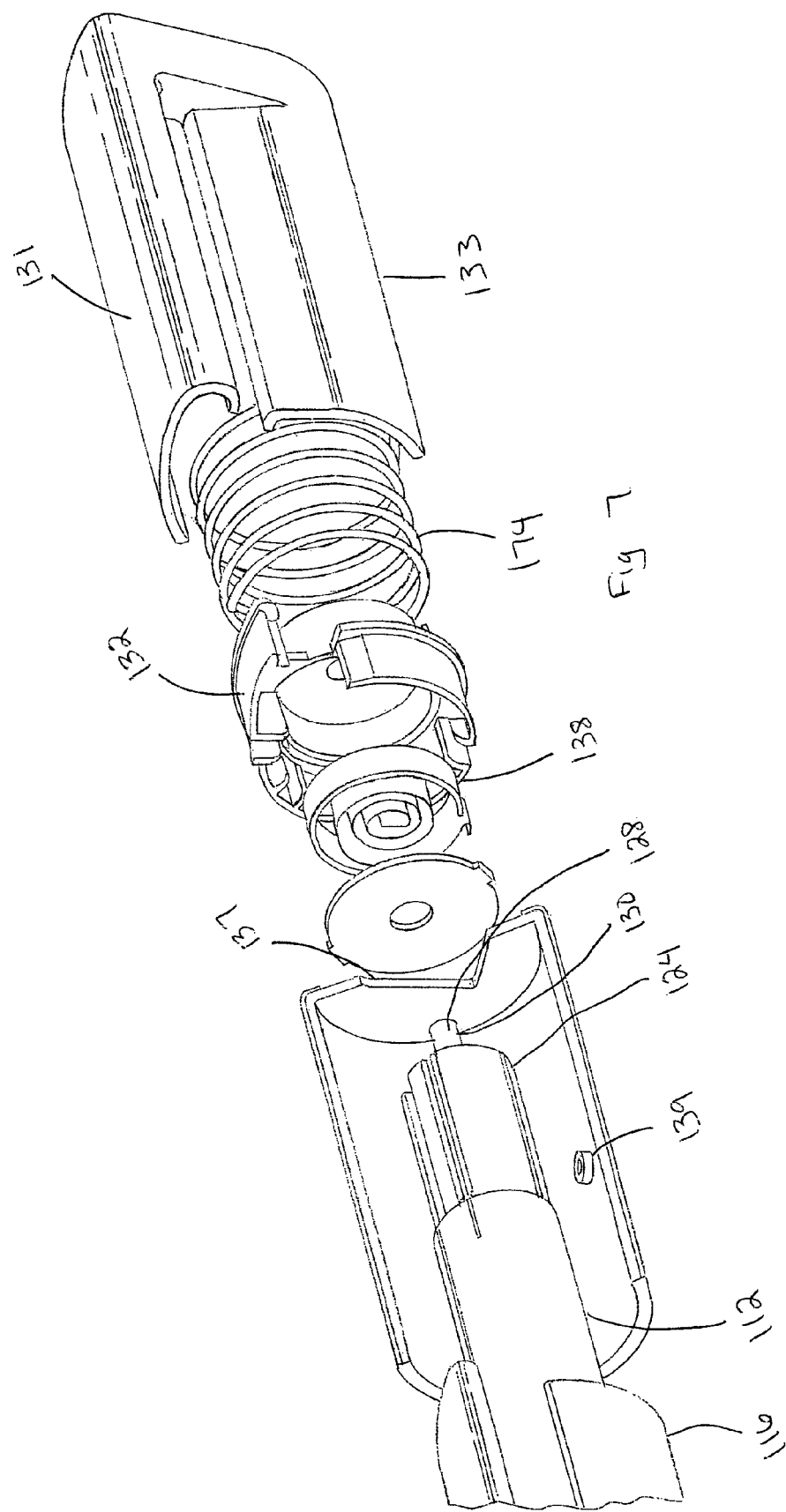
FIG. 7 shows an exploded view of an alternate embodiment of the security shade according to the present invention.
Figure 8:
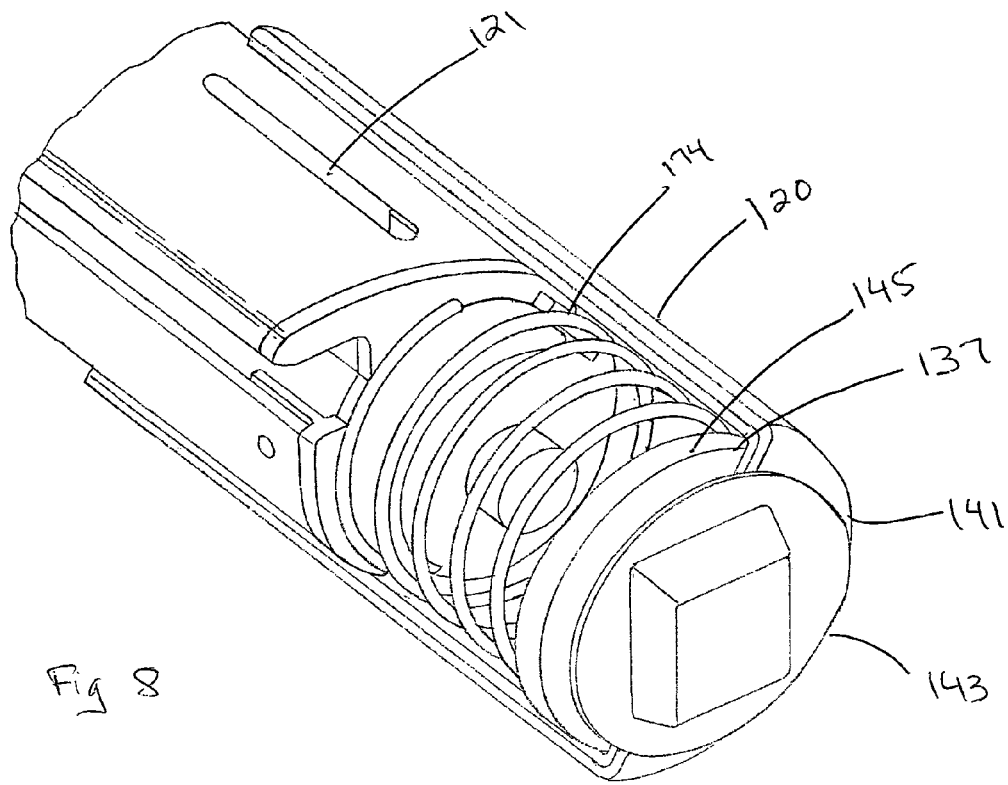
FIG. 8 shows a partial cutaway view of the end of a security shade according to an alternate embodiment of the present invention.
Figure 9:
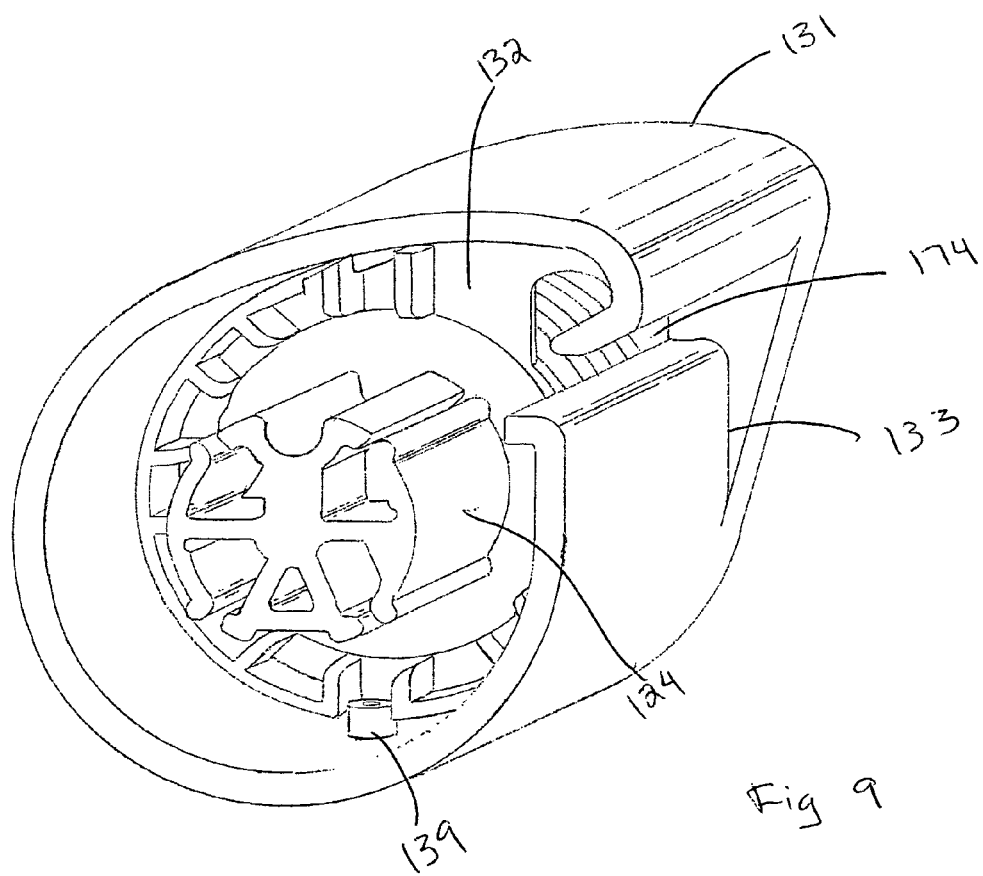
FIG. 9 shows an end cap for use in a security shade according to an alternate embodiment of the present invention.

The security shade includes a first and second support subassembly 20 arranged on each end of the roll tube 12 and cassette 16. Each of the support subassemblies 20 are capable of axial movement with relation to the end of the roll tube 12 and cassette 16. Therefore, each support assembly 20 is capable of being fully extended as shown in FIG. 1 or fully compressed as shown in FIG. 2 with relation to the cassette 16 and roll tube 12 thus allowing for insertion of the security shade 10 into the appropriate brackets located on an inside wall of the cargo area of the vehicle. The compression of the subassemblies 20 is independent of a motor spring and the ends of the roll tube 12 and cassette 16.

The subassembly 20 includes a bearing 24 which is arranged in an end of the roll tube 12. The bearing 24 includes a groove 26 which receives the rib 22 of the roller tube 12 therein thus preventing relative rotation between the bearing 24 and the roll tube 12 during operation of the security shade 10. The groove 26 will also properly align the bearing 24 with respect to the roll tube 12. The bearing 24 also includes an axle 28 extending from one end thereof from a generally mid point thereof. The axle 28 has a slot 30 formed therein along a mid point thereof. It should be noted that the bearing 24 is generally made of a plastic material however any other metal, ceramic, composite, or any other known material may be used to make the bearing 24 for the present invention.

The subassembly 20 also includes a spring housing 32 arranged within an end of the cassette 16. The spring housing 32 includes an arm 34 extending from one end thereof. The arm 34 generally has a curved surface to mimic that of the inner surface of the cassette 16. The spring housing 32 includes a circumferential cavity 36 defined on one end thereof. The cavity 36 will be used to receive a motor spring 38 therein. A plurality of locking fingers 40 extend from an edge of the circumferential cavity 36 at predetermined positions. A pocket 42 is arranged on or near an outer surface of the circumferential cavity 36. The cassette 16 and spring housing 32 will have a plurality of orifices 44 arranged through predetermined surface thereof to allow for a fastener to be placed through the orifice 44 in the outer surface of the cassette 16 and then through an orifice 44 of the spring housing 32 to secure and fix the spring housing 32 into the cassette 16. Any known type of fastener may be used to secure the cassette 16 to the spring housing 32 such as a dowel, pin, screw, rivet, staking, chemical bonds, etc. The spring housing 32 also has a first circumferential flange 46 extending from one end thereof and a second circumferential flange 48 extending from the same end. An orifice 50 is arranged at a mid point of the spring housing 32 and allows for the axle 28 of the bearing 24 to be arranged therein and provide support for the bearing 24 and roll tube 12. The spring housing 32 also includes a first and second shoulder member 52 extending from a gap 54 in the outer circumferential wall of the spring housing 32. The shoulder members 52 are arranged across from one another and are either directly formed into the outer edge or wall of the spring housing 32 or are separate members molded into the edge or wall of the spring housing 32. The shoulder members 52 will be used to engage with a stop member 56 of the end cap 58. The shoulder members 52 extend from a predetermined portion of the outer circumferential wall of the spring housing 32. The shoulders 52 extend in the same plane across the gap 54 from one another. The shoulder members 52 extend into the gap 54 a predetermined distance and angle such that they will engage with the stop 56 of the end cap 58.

The cassette 16 in another contemplated embodiment may have a plurality of knobs or nubs extending from an inner surface thereof. The knobs are arranged at predetermined positions along the inner surface of the end of the cassette 16. In the same alternate contemplated embodiment the spring housing 32 includes a plurality of indentations spaced around an outer surface thereof. The indentations will mate with and interact with the knobs extending from an inner surface of the cassette 16. When the spring housing 32 is arranged within the cassette 16 the knobs of the cassette 16 will align with and engage the indentations on the outer surface of the spring housing 32 thus fixing the spring housing 32 with relation to the end of the roll tube 12 and cassette 16.

The motor spring 38 is mounted or arranged within the circumferential cavity 36 of the spring housing 32. The motor spring 38 will provide a rotational biasing force to the roll tube 12. To achieve this, one end 60 of the motor spring 38 is fixedly or rigidly attached to the spring housing 32 in the pocket 42 thereof. While the opposing or moveable end 62 of the motor spring 38 is attached to the bearing 24 that couples and transfers rotation from the subassembly 20 to the roll tube 12. The motor spring 38 in the embodiment shown is a coil spring in the shape of a generally planar spiral. The coil spring has its radial outer end 60 fixed in the pocket 42 of the spring housing 32 and its radial inner end 62 as its rotatable end. The rotatable end 62 of the motor spring 38 is received within the slot 30 of the axle 28 extending from the bearing 24. The axle 28 is then received within the orifice 50 of the spring housing 32. The motor spring 38 is initially prewound and held in place until the subassembly 20 is further assembled to the roll tube 12 to form the finally assembled security shade 10. Then the motor spring 38 is released to provide the rotational biasing force necessary to retract the shade panel 14 onto the roll tube 12 when the security shade 10 is moved to its retracted position. Any known method of holding the motor spring 38 in its initial prewound position can be used according to the present invention. Such methodology may even be those as disclosed in U.S. Pat. No. 5,464,052 issued to the present assignee, which is hereby incorporated by reference.

After the motor spring 38 is arranged within the circumferential cavity 36 of the spring housing 32 a housing cap 64 is aligned with and placed over the locking fingers 40 of the spring housing 32 to lock the motor spring 38 within the spring housing 32. Next the axle 28 of the bearing 24 is placed through the orifice 50 of the housing cap 64 and engages the rotatable end 62 of the coil spring through the slot 30 in the axle 28. Once the motor spring 38 is secured within the spring housing 32, the spring housing 32 is secured within the inner surface of the cassette 16 while the bearing 24 is secured within the roll tube 12 as described above. This will allow the bearing 24 to rotate with the toll tube 12 while the spring housing 32 will be axially fixed with relation to the roll tube 12 and axially and rotatably fixed with relation to the cassette 16. The roll tube 12 will be capable of rotation with respect to the spring housing 32 and cassette 16. When the security shade 10 is put into its fully extended position, the bearing 24 will twist the motor spring 38 via the slot 30 in the axle 28 of the bearing 24 and create a rotational spring force to be used for retracting the shade panel 14 back onto the roll tube 12 when the shade panel 14 is removed from the brackets in the cargo area. The coiled spring will have a predetermined rotational energy stored therein such that when the shade panel 14 is released to its retracted position the coil spring will uncoil back to its neutral position thus rotating the roll tube 12 in a predetermined direction to wind the shade panel 14 back onto the outer surface of the roll tube 12 and into its retracted position within the cassette 16.

It should be noted that the spring housing 32 is generally made of a plastic material, however any other metal, ceramic, composite or any other known material may be used for the spring housing 32. It should also be noted that the motor spring 38 is generally made of a metal material however any other plastic, ceramic, fabric, composite or any other known material may also be used for the coil spring. Any known material can be used for the housing cap 64.

The subassembly 20 also includes an end cap 58 slidingly arranged over the end of the cassette 16 and an end portion of the spring housing 32 in one contemplated embodiment. The end cap 58 generally has a shape that will mimic the outer shape of the cassette 16. The end cap 58 will include a groove 66 extending at a predetermined distance on one side thereof. The end cap 58 has a predetermined shaped orifice 68 on an end surface thereof. The end cap 58 will also have a post or boss 70 extending from an end surface thereof to engage with the bracket or orifices located on the surface of the cargo area of the vehicle. This will ensure that the end cap 58 is aligned at a predetermined position with relation to the cargo area and will allow for the end cap 58 to be rotatably fixed with respect to the vehicle thus allowing no rotation between the end cap 58 and the vehicle cargo area. Extending inwardly in a radial direction from each edge of the groove 66 is a flange 72. The flange 72 generally has a U-shaped cross section. The flange 72 includes a stop member 56 extending a predetermined distance from a surface of the flange 72. The stop member 56 is capable of being arranged at different locations along the flange 72 to ensure for a variable range of travel distance for the end cap 58 with relation to the cassette 16 and spring housing 32. A first and second stop member 56 extends from the first and second flange 72 of the end cap 58. The stop members 56 will engage with the shoulder members 52 of the spring housing 32 when the end cap 58 is in its fully extended position as shown in FIG. 1. This will ensure that the end cap 58 is prevented from being removed from the spring housing 32 during operation of the security shade 10.

It should be noted that it is contemplated to use just one shoulder member 52 and one stop member 56 and flange 72 to create the necessary engagement in the fully extended position for the end cap 58. It is also contemplated to use any other known inter engagement or fastening techniques to ensure the end cap 58 does not become dislodged from the spring housing 32 or end of the cassette 16 during operation in its fully extended position. The groove 66 also will receive the shade panel 14 when the end cap 58 is in its fully compressed position and partially when in its fully extended position. It should be noted that the end cap 58 is generally made of a plastic material, however any other metal, composite, ceramic, rubber, or any other known material may be used for the end cap 58. The end cap 58 is capable of a predetermined amount of linear distance of travel with relation to the cassette 16 and spring housing 32 according to the present invention. This distance of linear travel is capable of being adjusted depending on manufacturer's requirements and the design of the automotive vehicle cargo area interiors.

A spring 74 is arranged between an outer surface of the spring housing 32 and an inner surface of the end cap 58. The spring 74 in one embodiment contemplated is a taper spring 74 with one end arranged within the circumferential flange 46 extending from one end of the spring housing 32 while the opposite end of the spring 74 is arranged around a circumferential flange extending from an inner surface of the end cap 58. The taper spring 74 will urge the end cap 58 in an axial direction away from the spring housing 32. When the spring 74 is compressed it will allow for the end cap 58 to move over the cassette 16 and spring housing 32 to allow for the roll tube 12 to be inserted into the brackets of the cargo area of the vehicle. Once the end cap bosses 70 are arranged within the brackets the spring 74 will urge the end cap 58 away from the spring housing 32 and cassette 16 thus allowing for the security shade 16 to be securely held within the cargo area of the automotive vehicle. It should be noted that the spring 74 used in one contemplated embodiment of the invention is made out of metal, however any other plastic, ceramic, composite, cardboard, paper, or natural material may be used to make the spring 74.

It is contemplated to use a subassembly 20 as described above on both ends of the cassette 16 and roll tube 12 of the security shade 10. This will allow for compression to be available on both ends allowing for easy insertion of the security shade 10 into the automotive vehicle cargo interior area. Most prior art security shades had one fixed end that was not capable of any compression or axial movement with relation to an end thereof and only one end that was capable of compression or axial movement with relation to an end of the cassette 16 or roller tube 12. The present invention will be capable of compression on both ends of the security shade 10 thus allowing for easier insertion and a greater range of compression for both multiple vehicle positions within multiple vehicle lines and within the same vehicle cargo interior. It should also be noted that having the motor spring 38 fixed with relation to the roll tube 12 and cassette 16 will reduce any potential for noise and vibration within the subassembly 20 of the security shade 10. The fixed motor spring 38 also allows for an increased range of compression for the security shade 10 thus allowing for multiple vehicle positions to be used by the same security shade 10 over a variety of line of vehicles and within a similar cargo area of vehicles of various manufacturers. It should also be noted that the end cap 58 will have a predetermined travel distance and spring force arranged between the spring housing 32 and the end cap 58 such that it can be adjusted to meet various requirements of the manufacturers for various vehicle lines.

It should be noted that during assembly of the support subassembly 20 the spring housing 32 will have the end cap flanges 72 placed through the gap 54 in the spring housing 32 outer wall with the end cap 58 being inserted at a predetermined angle to allow the shoulder surface 52 to be slid around and beyond the stop member 56 thus allowing for the stop member 56 to engage the shoulder surface 52 when the end cap 58 is properly aligned with the cassette 16 and roll tube 12. Thus, the end cap 58 is placed over the spring housing 32 before the subassembly 20 is placed over the end of the cassette 16 and into the roll tube 12. This will ensure that the end cap 58 cannot be dislodged from the end of the security shade 10 when in its fully extended position. The end cap 58 is capable of being secured within the cargo area of the automotive interior either in its fully extended position, its fully compressed position, or a partially compressed position. The end cap 58 is designed to be robust and strong enough to ensure the security shade 10 is properly secured within the cargo area during both its retracted and fully extended positions during operation of the shade panel 14.

Like numerals indicate like parts. FIGS. 6 through 9 show an alternate embodiment of a fixed motor spring shade 110 according to the present invention. The security shade 110 includes a roll tube 112 with a shade panel 114 wound about the roll tube 112 and fixed to the roll tube 112 on one end of the panel 114. The security shade 110 also includes a cassette or trim cover 116 which fits over both the roll tube 112 and the wounded shade panel 114. The cassette 116 protects mechanical components of the security shade 110 from inadvertent damage, and prevents foreign objects from interfering with the operation and provides an enhanced appearance for the security shade 110. The cassette 116 includes a longitudinal slot 118 along an entire length there of which will provide a route for the shade panel 114 to be deployed from and retracted onto the roll tube 112 without interference. The cassette 116 in the alternate embodiment also includes a second slot 121 having a predetermined length located near or at either end of the cassette 116. The slot 121 may have an oval overall shape or any other shape depending on the needs of the security shade 110.

A support assembly 120 is arranged on each end of the roll tube 112 and cassette 116. Each of the support assemblies 120 are capable of axial movement with relation to the end of the roll tube 112 and cassette 116. Therefore, each support assembly 120 is capable of being fully extended or fully compressed as shown in the figures with relation to the cassette 116 and roll tube 112 thus allowing for insertion of the security shade 110 into the appropriate brackets located on the inside wall of the cargo area of the vehicle. The compression of the subassemblies 120 is independent of a motor spring 138 and the ends of the roll tube 112 and cassette 116. The subassembly 120 includes a bearing 124 which is arranged in an end of the roll tube 112. The bearing 124 includes an axle 128 extending from one end thereof from generally a mid point thereof. The subassembly 120 further includes a spring housing 132 arranged within an end of the cassette 116. The spring housing 132 may include an arm extending from an end thereof. A motor spring 138 is mounted or arranged within a circumferential cavity of the spring housing 132. The motor spring 138 will provide a rotational biasing force to the roll tube 112. The motor spring 138 is engaged with a slot 130 on the end of the axle 128 extending from the bearing 124.

The subassembly 120 also includes an end cap 131 slidingly arranged over an end of the cassette 116 and an end portion of the spring housing 132 in one contemplated embodiment. The end cap 131 generally has a shape that will mimic and mate with the outer shape of the cassette 116. The end cap 131 includes a groove 133 extending a predetermined distance on one side thereof. The end cap 131 has a predetermined shaped orifice 137 located at a mid or center point on an end surface thereof. The orifice 137 may have any known shape. The end cap 131 also includes a stop member 139 extending from an inside surface thereof. The stop member 139 generally has a form of a cylindrical post or peg extending from the surface thereof a predetermined distance. The stop member 139 will be slidingly arranged within the second slot 121 of the cassette 116. This will allow for linear movement of the end cap 131 with respect to the end of the cassette 116. The end cap 131 will be capable of movement within the range defined by the length of the second slot 121 in the cassette 116. The stop member 139 may engage either end of the second slot 121 to create a limit of travel movement of the end cap 131 with respect to the cassette 116 on both ends thereof. It should be noted that any other shape may be used for the stop member 139 extending from the inside surface of the end cap 131 depending on the shape and length of the second slot 121 of the cassette 116. Arranged in the orifice 137 on the end surface of the end cap 131 is an insert member 141. In the contemplated alternate embodiment shown a rubber insert member 141 is arranged therein. However, it should be know that any other plastic, ceramic, metal, material or urethane material may also be used to create the insert member 141 arranged in the orifice 137 on the end of the end cap 131. The insert member 141 generally has a disc like shape with a boss 143 extending from an end thereof. In the embodiment shown the boss 143 generally has a square shape with angled edges. However, any other shaped boss 143 can be used on the end of the rubber insert member 141. The rubber insert member 141 will also include a circumferential groove 145 around an outer periphery thereof. The groove 145 will be arranged within the orifice 137 of the end cap 131 such that the groove 145 is seated over the surface of the end cap 131 defined by the orifice 137. The security shade subassembly 120 also may include a spring 174 arranged between the cassette 116 and the end cap 131. In the embodiment shown the spring 174 contacts the spring housing 132 on one end thereof and a surface of the rubber insert member 141 on the opposite end thereof.

The operation of the alternate embodiment security shade 110 is generally the same as that described above for FIGS. 1 through 5.

The present invention has been described in an illustrative manner, it is to be understood that the terminology which has been used is intended to be in the nature of words of description rather than that of limitation.

Many modifications and variations of the present invention are possible in light of the above teachings. Therefore, within the scope of the appended claims, the present invention may be practiced otherwise than as specifically described.

What is claimed is:

1. A support assembly for use on a shade in a vehicle, said support assembly including:
    an end cap having an end surface;
    an orifice arranged in said end surface; and
    an insert arranged within said orifice, said insert having a generally disc shape, said insert having a circumferential groove around an outer periphery thereof, said groove of said insert is seated over said end surface of said end cap defined by said orifice.

2. The support assembly of claim 1 wherein said end cap having a stop member extending from an inside surface thereof.

3. The support assembly of claim 2 wherein said stop member having a generally cylindrical shape, said stop member slidingly arranged within a slot of a cassette.

4. The support assembly of claim 1 wherein said insert having a generally square boss extending therefrom, said insert is axially fixed within said orifice, said insert having a first surface of said groove in contact with an inside surface of said end surface and a second surface of said groove in contact with an outside surface of said end surface, said first surface is parallel to said second surface.

5. The support assembly of claim 1 further comprising a spring housing arranged within said end cap and a motor spring arranged within said spring housing.

6. The support assembly of claim 5 further comprising a spring arranged between and in contact with said insert and said spring housing, said insert is made of a rubber.

7. The support assembly of claim 5 further comprising a bearing engaged with said motor spring.

8. The support assembly of claim 1 wherein said end cap having a groove therein.

9. A shade for use in a vehicle, said shade comprising:
    a cassette having a slot therein;
    a roll tube arranged within said cassette;
    a shade panel fixed to said roll tube;
    a bearing arranged in an end of said roll tube;
    a spring housing having an outer periphery surface, said outer periphery surface in contact with an inside surface of said cassette and arranged in an end of said cassette; and
    an end cap having a stop member extending from an inside surface thereof, said stop member is arranged within said slot, said stop member slides within said slot.

10. The shade of claim 9 further comprising a motor spring arranged within said spring housing, said stop member sliding within said slot allows for linear movement of said end cap with respect to an end of said cassette.

11. The shade of claim 9 further comprising a spring arranged between said spring housing and an insert.

12. The shade of claim 9 wherein said end cap having an orifice in an end thereof.

13. The shade of claim 12 wherein said orifice having an insert therein, said insert having a boss extending from an end thereof.

14. The shade of claim 13 wherein said insert having a generally disc shape.

15. The shade of claim 14 wherein said insert having a circumferential groove along an outer surface thereof.

16. The shade of claim 9 wherein said end cap having a groove therein, said shade panel capable of passing through said groove, said cassette having a second slot therein, said second slot provides a route for said shade panel into and out of said cassette.

17. The shade of claim 9 wherein said spring housing and said end cap are arranged on both ends of said cassette.

18. The shade of claim 9 wherein said motor spring is fixed and allows for a predetermined range of compressions for said end cap.

19. A shade for use in a vehicle, said shade comprising:
    a cassette having a first slot arranged near one end thereof and a second slot arranged near another end thereof;
    a roll tube arranged within said cassette;
    a panel fixed to said roll tube;
    a bearing arranged in each end of said roll tube;
    a spring housing in contact with said cassette and arranged in each end of said cassette;

a motor spring arranged in each of said spring housings; and an end cap arranged on each end of said cassette, each said end cap having an orifice in an end thereof and a stop member extending from an inside surface thereof, wherein one of said stop members is slidingly arranged in said first slot and another of said stop members is slidingly arranged in said second slot.

20. The shade of claim 19 wherein said end cap having a rubber insert arranged in said orifice.

* * * * *